(12) United States Patent
Chen et al.

(10) Patent No.: US 11,606,004 B2
(45) Date of Patent: Mar. 14, 2023

(54) SELF-COOLING MOTOR AND HOT-AIR-CIRCULATION DEVICE USING THE SAME

(71) Applicant: Delta Electronics, Inc., Taoyuan (TW)

(72) Inventors: Hou-Chu Chen, Taoyuan (TW); Yueh Hsiung, Taoyuan (TW); Kun-Chou Lee, Taoyuan (TW); Chin-Chu Hsu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 122 days.

(21) Appl. No.: 17/164,328

(22) Filed: Feb. 1, 2021

(65) Prior Publication Data
US 2022/0140696 A1 May 5, 2022

(30) Foreign Application Priority Data
Oct. 30, 2020 (CN) .......................... 202011190554.4

(51) Int. Cl.
*H02K 9/06* (2006.01)
*H02K 11/33* (2016.01)
(Continued)

(52) U.S. Cl.
CPC .............. *H02K 9/06* (2013.01); *H02K 5/225* (2013.01); *H02K 11/33* (2016.01); *H02K 1/18* (2013.01); *H02K 1/276* (2013.01); *H02K 7/14* (2013.01)

(58) Field of Classification Search
CPC ............ H02K 5/20; H02K 5/207; H02K 9/00; H02K 9/02; H02K 9/04; H02K 9/06;
(Continued)

(56) References Cited

U.S. PATENT DOCUMENTS

| 5,191,247 A * | 3/1993 | Possell .................. F04D 17/161 |
| | | 415/90 |
| 9,800,116 B2 | 10/2017 | Iwai et al. |
| 2015/0295471 A1 * | 10/2015 | Iwai ......................... H02K 1/32 |
| | | 310/62 |

FOREIGN PATENT DOCUMENTS

CN 102594023 B 3/2015
DE 202008015895 U1 * 3/2009
(Continued)

OTHER PUBLICATIONS

Machine translation of de202008015895, Mar. 2009 (Year: 2009).*

*Primary Examiner* — Eric Johnson
(74) *Attorney, Agent, or Firm* — Kirton McConkie; Evan R. Witt

(57) ABSTRACT

The disclosure relates to a self-cooling motor and a hot-air-circulation device using the same. The self-cooling motor includes a housing, a stator assembly, a rotor assembly and an impeller. The housing includes a sleeve and a bottom plate. The sleeve has a first end and a second end opposite to each other. The bottom plate is disposed adjacent to the first end and forms an inlet facing a radial direction. The rotor assembly coupled to the stator assembly includes a shaft extending outside the housing along an axial direction. The impeller is fixed to the shaft and is adjacent to the second end to form an outlet facing the radial direction. When the shaft drives the impeller to rotate, the airflow enters through the inlet and is discharged from the outlet in the radial direction.

18 Claims, 14 Drawing Sheets

(51) Int. Cl.
*H02K 5/22* (2006.01)
*H02K 1/276* (2022.01)
*H02K 1/18* (2006.01)
*H02K 7/14* (2006.01)

(58) Field of Classification Search
CPC .......... H02K 9/08; H02K 11/30; H02K 11/33; H02K 1/18; H02K 1/187; H02K 1/2791; H02K 1/27915; H02K 1/2792; H02K 7/14; H02K 21/22
See application file for complete search history.

(56) References Cited

FOREIGN PATENT DOCUMENTS

| | | | | |
|---|---|---|---|---|
| JP | 2011147337 A | 7/2011 | | |
| WO | WO-2017022007 A1 * | 2/2017 | ............... | H02K 7/18 |
| WO | WO-2019145091 A1 * | 8/2019 | ............... | B61C 3/00 |

* cited by examiner

SELF-COOLING MOTOR AND HOT-AIR-CIRCULATION DEVICE USING THE SAME

FIELD OF THE INVENTION

The present disclosure relates to a motor, and more particularly to a self-cooling motor and a hot-air-circulation device using the same.

BACKGROUND OF THE INVENTION

In current food heat-treatment equipment on the market, the hot-air-circulation device mostly uses an AC motor, which extends to the heating chamber through a shaft and drives the fan assembly to rotate, so that the hot air in the heating chamber is circulated. However, since the AC motor is not easy to provide the functions of forward-and-reverse rotation and speed control, an uneven temperature distribution in the heating chamber is generated easily, and it leads to a reduction in the quality of food heating.

In order to further improve the quality of food heating in the food heat-treatment equipment, a brushless DC motor is used in the market to replace the AC motor as the driving motor for the food heat-treatment equipment. Since the brushless DC motor has the functions of forward-and-reverse rotation and speed control that the AC motor does not have, the AC motor is replaced by the brushless DC motor to make the hot-air circulation of the heating chamber more uniform and achieve the better quality of food heating.

When the driving motor is applied to a hot-air-circulation device, the driving motor and the heating chamber are connected through an air inlet. However, the risk of exposure of internal parts in the driving motor is increased due to such a structure of the air inlet, and the circuit of the driving motor may be damaged by an external static electricity or a foreign matter intrusion easily. Furthermore, a large amount of heat energy is transferred to the motor device due to the high temperature of the heating chamber, and the internal temperature of the driving motor is increased. As a result, the internal parts of the driving motor may be damaged or the service life of the driving motor may be reduced.

Therefore, there is a need of providing a self-cooling motor and a hot-air-circulation device using the same to overcome the above drawbacks.

SUMMARY OF THE INVENTION

An object of the present disclosure is to provide a self-cooling motor and a hot-air-circulation device using the same. The motor has a shaft extended to the high-temperature heating chamber of the hot-air-circulation device through an impeller, and a radial air outlet and a radial air inlet are formed by assembling the impeller with the housing to optimize the heat dissipation efficiency of the motor. The impeller is arranged between the motor and the heating chamber, so that it is facilitated to block the radiant heat from the heating chamber. Moreover, it is helpful of improving the temperature conditions inside the motor to extend the service life of the internal parts, and reducing the probability of damage to the internal parts. Thus, the motor has higher stability. Furthermore, the impeller further includes a plurality of blades, which extend toward the space of the motor, and are arranged radially. When the impeller rotates with the shaft of the motor, the blades disposed on the impeller drive the airflow to discharge out radially to form a negative pressure. The heat generated by the stator components, such as silicon steel sheets and windings, is transferred toward the negative pressure region and then is discharged out in the radial direction to achieve the heat dissipation performance of the self-cooling motor. Moreover, the heat dissipation performance of the self-cooling motor is not easily affected by the heating chamber of the hot air circulation device.

Another object of the present disclosure is to provide a self-cooling motor and a hot-air-circulation device using the same. The self-cooling motor is fastened to the box of the hot-air circulation device through a plurality of fastening elements on the housing, and the shaft of the motor extends into the heating chamber of the box through the impeller. While the self-cooling motor is fastened to the box, the fastening elements provide the function of fastening and reinforcing the structure.

A further object of the present disclosure is to provide a self-cooling motor and a hot-air-circulation device using the same. The airflow enters the space through an inlet formed between the bottom plate and the first end of the sleeve, flows through the space in the axial direction and is discharged out through an outlet formed between the impeller and the second end of the sleeve. Since the rotor assembly and the circuit board in the space further include openings facing the axial direction, it is conducive to a smooth passage of the airflow. Furthermore, the heat generated by the stator assembly and the internal parts on the circuit board is dissipated effectively. Thus, the heat dissipating efficiency of the self-cooling motor is further enhanced.

According to an aspect of the present disclosure, a self-cooling motor is provided and includes a housing, a stator assembly, a rotor assembly and an impeller. The housing includes a sleeve and a bottom plate. The sleeve and the bottom plate are arranged in an axial direction and define a space. The sleeve has a first end and a second end opposite to each other. The bottom plate is disposed adjacent to the first end, and an inlet is formed between the bottom plate and the first end. The inlet faces a radial direction of the sleeve. The stator assembly is fixed to the housing and accommodated in the space. The rotor assembly is coupled to the stator assembly and includes a shaft. The shaft extends outside the housing along the axial direction. The impeller is fixed to the shaft and adjacent to the second end to form an outlet. The outlet faces the radial direction of the sleeve. When the shaft drives the impeller to rotate, an airflow is generated by the impeller, the airflow enters the space through the inlet in the radial direction and is discharged from the space through the outlet in the radial direction.

In an embodiment, the impeller includes a first side, a second side and a plurality of blades, the first side and the second side are opposite to each other, the first side faces the space, and the blades are disposed on the first side.

In an embodiment, none of perforation is disposed between any adjacent two blades of the blades.

In an embodiment, an outer periphery of each one of the blades does not exceed an outer periphery of the rotor assembly along the radial direction outwardly.

In an embodiment, the self-cooling motor further includes a circuit board disposed adjacent to the first end of the sleeve and has an opening. The circuit board is disposed upwardly along the axial direction. The circuit board is located above or aligned with the first end of the sleeve.

In an embodiment, the bottom plate has an outer periphery aligned with or exceeding an inner periphery of the sleeve along the radial direction outwardly.

In an embodiment, the stator assembly further includes a coil, and the opening of the circuit board spatially corresponds to the coil.

In an embodiment, the rotor assembly includes a shell and a magnet set, wherein the shell is fixed to the shaft and has an opening facing the axial direction, and the magnet set is disposed around an inner periphery of the shell.

In an embodiment, the housing further includes a plurality of fastening elements configured to fasten the self-cooling motor on a box, wherein the outlet is disposed between the fastening elements.

In an embodiment, the housing further includes a plurality of connecting elements connected between the first end of the sleeve and the bottom plate, wherein the inlet is disposed between the connecting elements.

In an embodiment, the impeller is made of a metal material, a low thermal conductivity material or a ceramic material.

In an embodiment, there is no perforation passing through the impeller while the impeller is fixed to the shaft.

In an embodiment, an outer periphery of each one of the blades does not exceed an outer periphery of the shell along the radial direction outwardly.

According to another aspect of the present disclosure, a hot-air-circulation device is provided and includes a box, a self-cooling motor and a fan assembly. The box includes a heating chamber. The self-cooling motor includes a housing, a stator assembly, a rotor assembly and an impeller. The housing is fastened on the box and includes a sleeve and a bottom plate. The sleeve and the bottom plate collaboratively define a space, the sleeve has a first end and a second end opposite to each other, the bottom plate is disposed adjacent to the first end, and an inlet is formed between the bottom plate and the first end. The inlet faces a radial direction of the sleeve, and the second end faces the heating chamber. The stator assembly is fixed to the housing and accommodated in the space. The rotor assembly is coupled to the stator assembly and includes a shaft. The shaft extends into the heating chamber of the box along the axial direction. The impeller is fixed to the shaft and located adjacent to the second end to form an outlet. The outlet faces the radial direction of the sleeve. When the shaft drives the impeller to rotate synchronously, an airflow is generated by the impeller, the airflow enters the space through the inlet in the radial direction and is discharged out of the space through the outlet in the radial direction. The fan assembly is connected to the shaft. When the self-cooling motor drives the fan assembly to rotate, hot air is circulated in the heating chamber.

In an embodiment, the impeller includes a first side, a second side and a plurality of blades, the first side and the second side are opposite to each other, the second side faces the heating chamber. The blades are disposed on the first side, extend toward the space and are arranged radially.

In an embodiment, the self-cooling motor further includes a circuit board having an opening, and the stator assembly includes a coil, wherein the opening of the circuit board spatially corresponds to the coil.

In an embodiment, the rotor assembly includes a shell and a magnet set, the shell is fixed to the shaft and has an opening facing the axial direction, and the magnet set is disposed around an inner periphery of the shell, wherein the impeller includes a plurality of blades extending outwardly along the radial direction, and an outer periphery of each one of the blades does not exceed an outer periphery of the rotor assembly along the radial direction outwardly.

In an embodiment, the housing further includes a plurality of fastening elements configured to fasten the self-cooling motor on the box.

In an embodiment, the housing further includes a plurality of connecting elements connected between the first end of the sleeve and the bottom plate, wherein the inlet is disposed between the connecting elements.

In an embodiment, the bottom plate, the sleeve, the impeller and the fan assembly are arranged in sequence along the axial direction.

The above objects and advantages of the present disclosure become more readily apparent to those who are ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only; it is not intended to be exhaustive or to be limited to the precise form disclosed.

Figure 1:
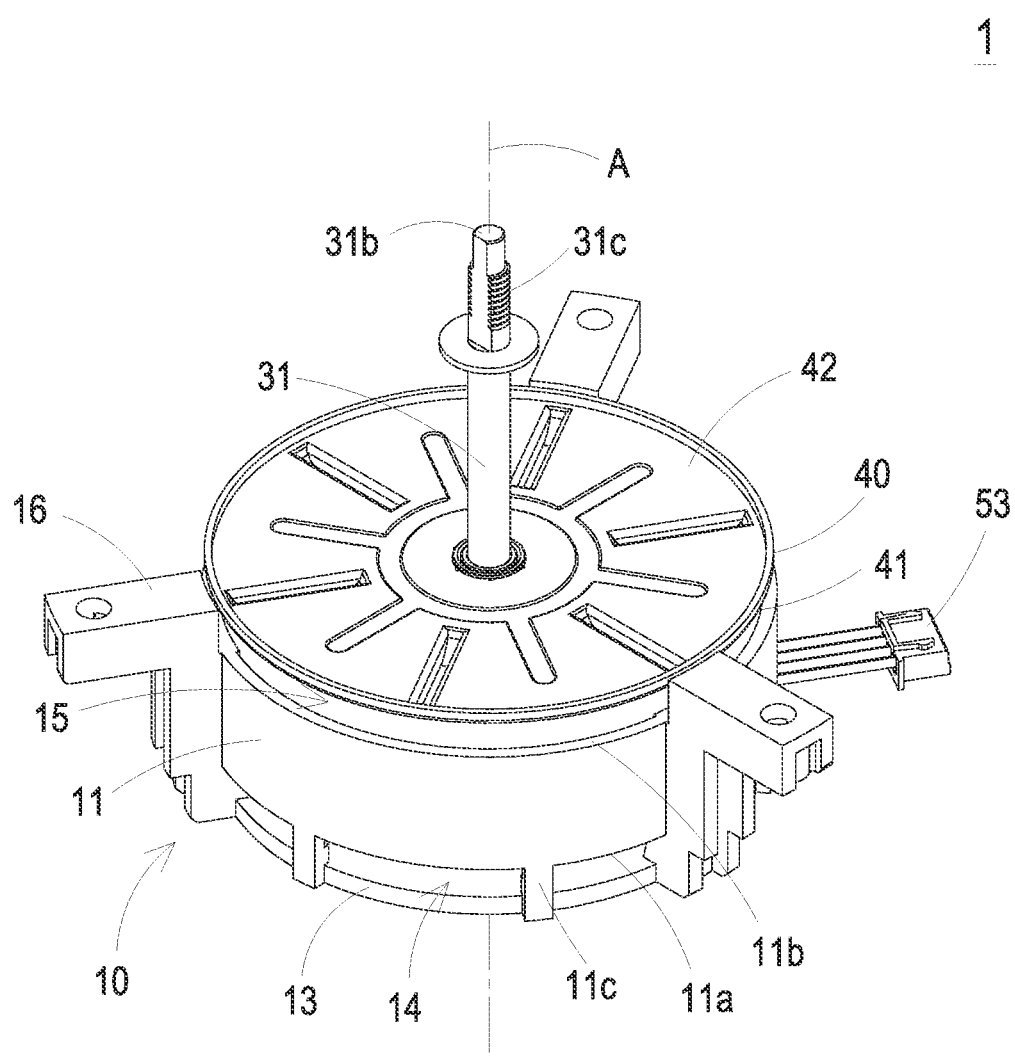
FIG. 1 shows a perspective view of a self-cooling motor according to a first embodiment of the present disclosure.
Figure 2:
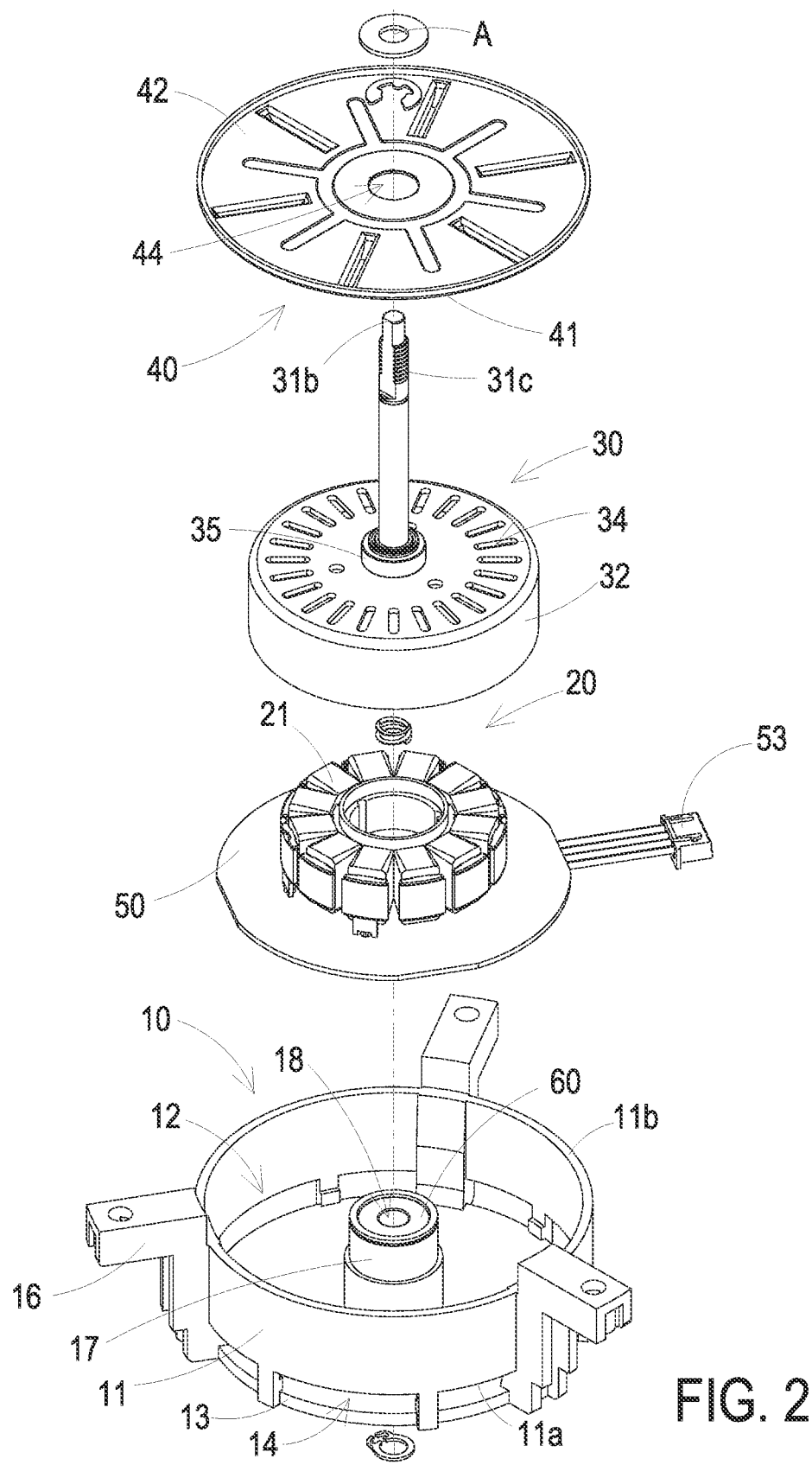
FIG. 2 shows an exploded view of the self-cooling motor according to the first embodiment of the present disclosure.
Figure 3:
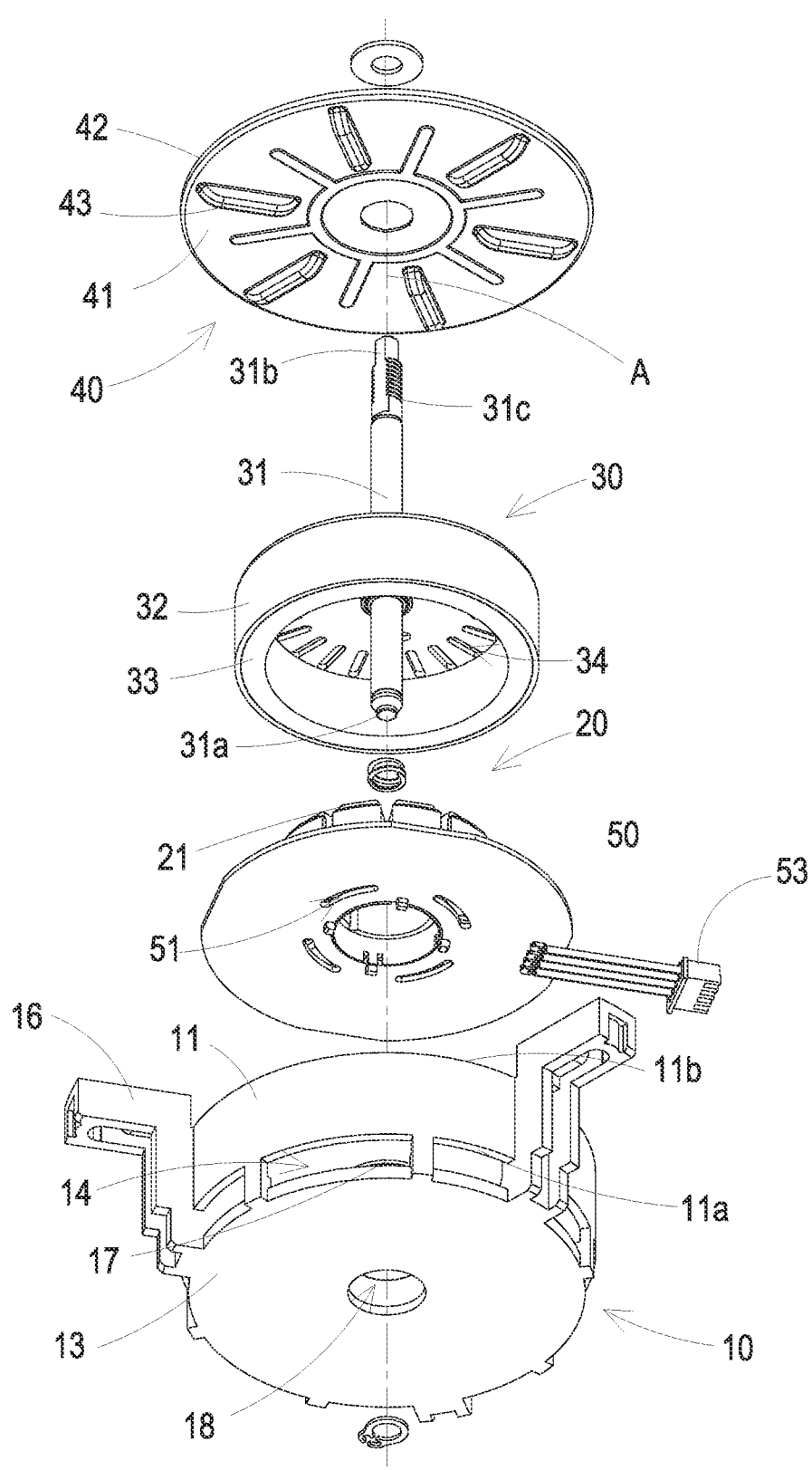
FIG. 3 shows an exploded view of the self-cooling motor according to the first embodiment of the present disclosure and taken from another perspective.
Figure 4:
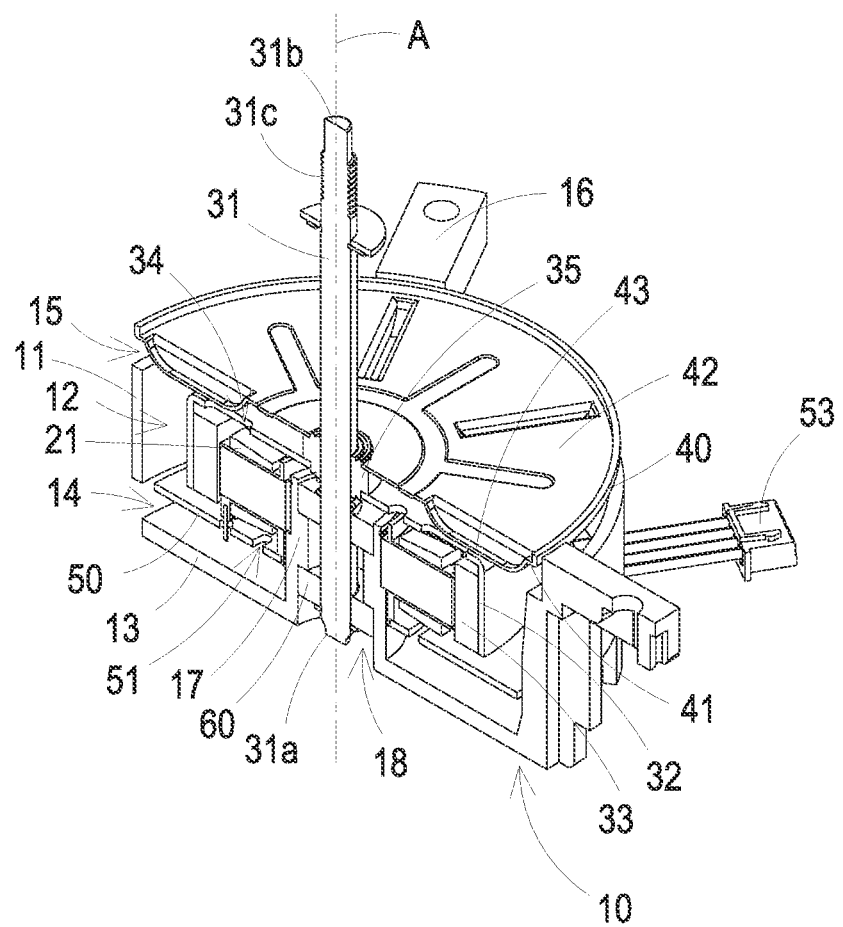
FIG. 4 shows a cross-sectional structure of the self-cooling motor according to the first embodiment of the present disclosure.
Figure 5:
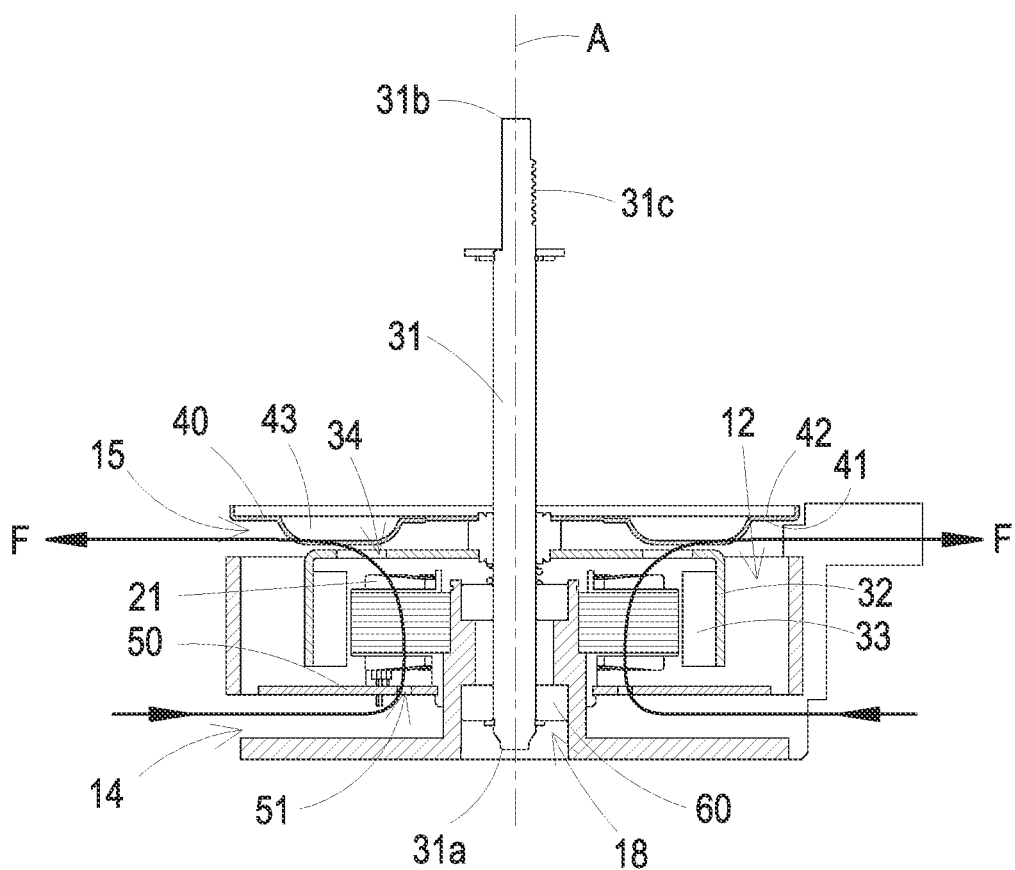
FIG. 5 is a cross-sectional view illustrating an airflow of the self-cooling motor according to the first embodiment of the present disclosure.
Figure 6:
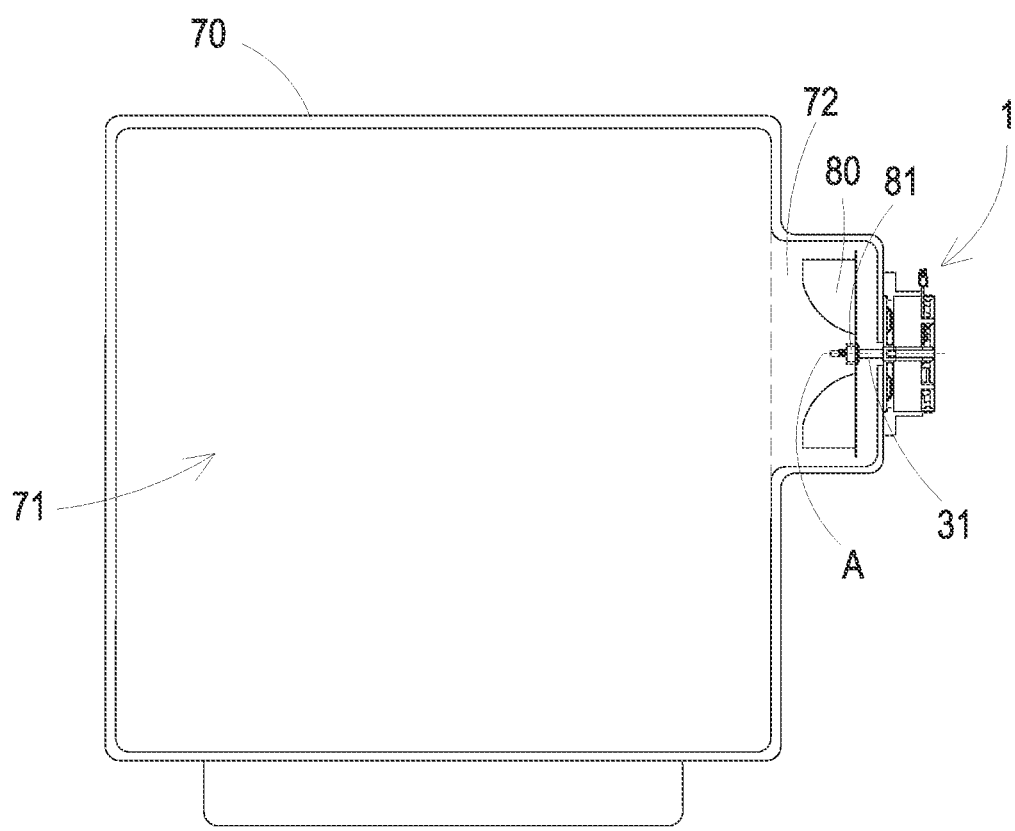
FIG. 6 shows a cross-sectional view of a hot-air-circulation device according to an embodiment of the present disclosure.

FIG. 1 shows a perspective view of a self-cooling motor according to a first embodiment of the present disclosure. FIG. 2 shows an exploded view of the self-cooling motor according to the first embodiment of the present disclosure. FIG. 3 shows an exploded view of the self-cooling motor according to the first embodiment of the present disclosure and taken from another perspective. FIG. 4 shows a cross-sectional structure of the self-cooling motor according to the first embodiment of the present disclosure. FIG. 5 is a cross-sectional view illustrating an airflow of the self-cooling motor according to the first embodiment of the present disclosure. FIG. 6 shows a cross-sectional view of a hot-air-circulation device according to an embodiment of the present disclosure. In the embodiment, a self-cooling motor (hereinafter also referred to as the motor) 1 is configured to drive, for example, a fan assembly 80 disposed adjacent to a heating chamber 71 of a hot-air-circulation device 2. Facing the high-temperature environment in the heating chamber 71, the self-cooling motor 1 provides a function of heat dissipation by itself, and is not affected by the high-temperature environment in the heating chamber 71. Certainly, the application of the self-cooling motor 1 is not limited thereto. Preferably but not exclusively, the self-cooling motor 1 is a brushless DC motor. In the embodiment, the self-cooling motor 1 includes a housing 10, a stator assembly 20, a rotor assembly 30 and an impeller 40. The housing 10 includes a sleeve 11 and a bottom plate 13. The sleeve 11 and the bottom plate 13 are arranged in an axial direction A and define a space 12. The sleeve 11 has a first end 11a and a second end 11b opposite to each other. The bottom plate 13 is disposed adjacent to the first end 11a of the sleeve 11. Moreover, an air inlet 14 is formed between the bottom plate 13 and the first end 11a of the sleeve 11. The air inlet 14 faces a radial direction of the sleeve 11. In the embodiment, the bottom plate 13 has an outer periphery aligned with or exceeding an inner periphery of the sleeve 11 along the radial direction outwardly. In other words, viewing the bottom plate 13 in the axial direction A, the air inlet 14 is not visible. Preferably but not exclusively, the sleeve 11 is a cylindrical retaining wall. In the embodiment, the stator assembly 20 is fixed to the housing 10 and accommodated in the space 12. The rotor assembly 30 is coupled to the stator assembly 20 and includes a shaft 31. The shaft 31 extends outside the housing 10 along the axial direction A. The impeller 40 is fixed to the shaft 31 and adjacent to the second end 11b to form an air outlet 15 between the impeller 40 and the second end 11b of the sleeve 11. The air outlet 15 faces the radial direction of the sleeve 11. When the shaft 31 of the rotor assembly 30 drives the impeller 40 to rotate synchronously, an airflow F is generated by the impeller 40, the airflow F enters the space 12 through the air inlet 14 in the radial direction and is discharged from the space 12 through the air outlet 15 in the radial direction. In the embodiment, the axial direction A is indicated from the first end 11a to the second end 11b of the sleeve 11. In this way, the motor 1 provides a heat dissipation performance of self-cooling, and the impeller 40 and the housing 10 are collaborated to form the air inlet 14 and the air outlet 15 facing the radial direction, so as to optimize the heat dissipation performance of the motor 1. On the other hand, the impeller 40 is arranged between the motor 1 and the heating chamber 71, so that it is facilitated to block the radiant heat from the heating chamber 71. Moreover, it is helpful of improving the temperature conditions inside the motor 1 to extend the service life of the internal parts, and reducing the probability of damage to the internal parts. Thus, the motor 1 has higher stability.

Figure 7A:
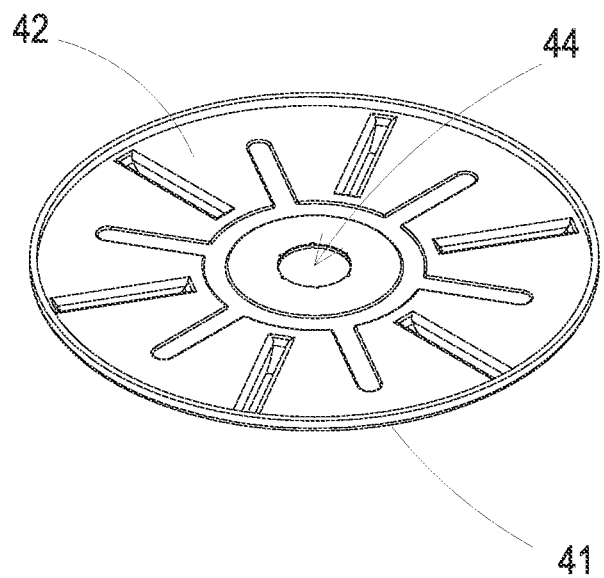
FIG. 7A and FIG. 7B are an exemplary structure showing the impeller of the present disclosure.
Figure 7B:
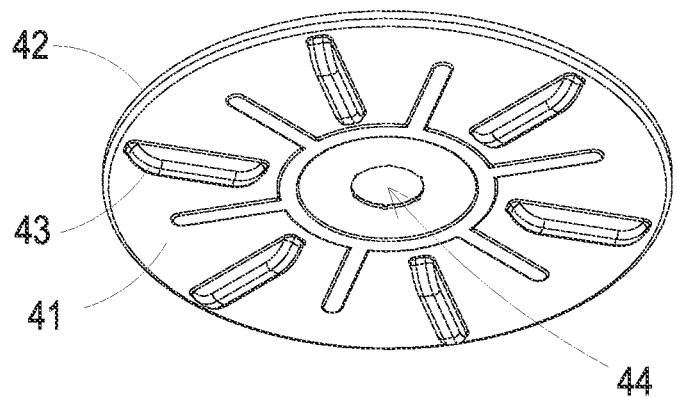

FIG. 7A and FIG. 7B show an exemplary structure of the impeller in the present disclosure. Please refer to FIG. 5, FIG. 7A and FIG. 7B. In the embodiment, the impeller 40 further includes a first side 41, a second side 42 and a plurality of blades 43. The first side 41 and the second side 42 are opposite to each other. The first side 41 faces the space 12. The second side 42 faces the heating chamber 71. The blades 43 are disposed on the first side 41, extend toward the space 12 and are arranged radially. In the embodiment, there is no perforation between any two adjacent blades 43. Since the blades 43 of the impeller 40 are extended toward the space 12 and arranged radially, when the impeller 40 is rotated with the shaft 31 of the motor 1, the blades 43 disposed on the impeller 40 drive the airflow F to discharge out radially through the air outlet 15 to form a negative pressure. The heat generated by the stator assembly 20, such as silicon steel sheets and winding, is transferred toward the negative pressure region along the axial direction A, and then is discharged out in the radial direction to achieve the heat dissipation performance of the self-cooling motor 1. Moreover, the heat dissipation performance of the self-cooling motor 1 is not easily affected by the heating chamber 71 of the hot air circulation device 2. In the embodiment, the impeller 40 is made of for example but not limited to a metal material through a stamping process. Preferably but not exclusively, the impeller 40 and the blades 43 are integrally formed. In an embodiment, the impeller 40 is made of a low thermal conductivity material to block the radiant heat from the heating chamber 71, and the airflow F is generated by the blades 43. In other embodiments, the impeller 40 is made of a ceramic material. Certainly, the present disclosure is not limited thereto. Moreover, in the embodiment, the impeller 40 includes a central opening 44 and is fixed to the shaft 31 through a fastening element 35. In an embodiment, without any fastening element for fixing the impeller 40, the shaft 31 passes through the central opening 44, and fits with the central opening 44 tightly, so that the impeller 40 is fixed to the shaft 31. Notably, except for the central opening 44, the impeller 40 doesn't have any additional perforation. Namely, there is no perforation passing through the impeller 40 while the impeller 40 is fixed to the shaft 31. Thus, when the impeller 40 is rotated synchronously with the shaft 31 of the motor 1, the airflow F is generated therefrom to dissipate the heat generated inside the motor 1 effectively, and the impeller 40 without any additional perforation is more beneficial of blocking the radiant heat from the heating chamber 71. It is helpful of improving the temperature conditions inside the motor 1 to extend the service life of the internal parts, and reducing the probability of damage to the internal parts. Thus, the motor 1 has higher stability.

Figure 8A:
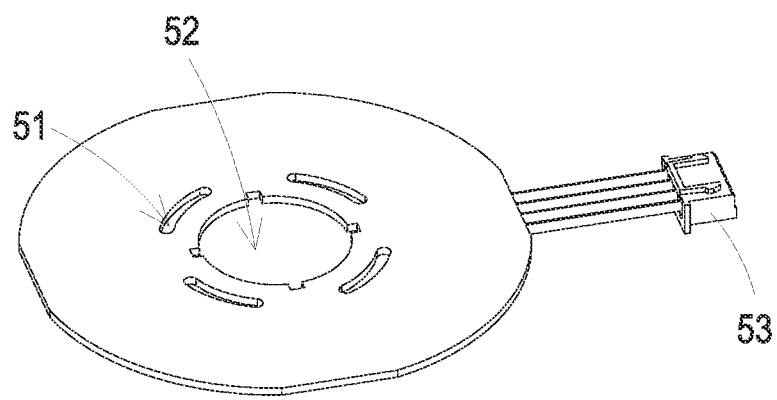
FIG. 8A and FIG. 8B are an exemplary structure showing the circuit board of the present disclosure.
Figure 8B:
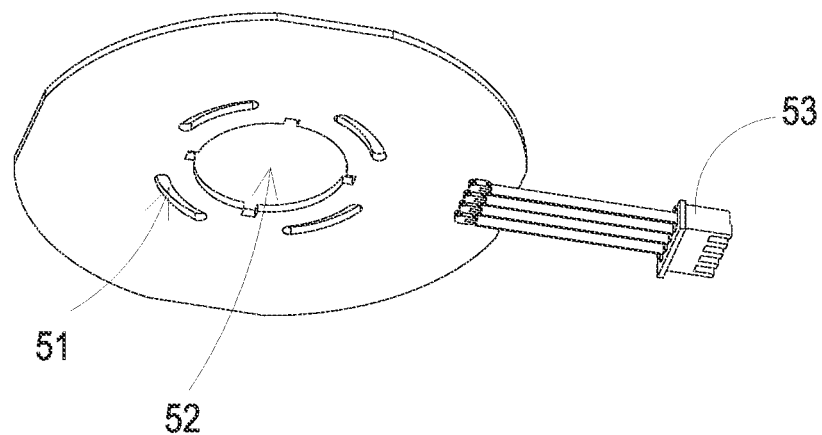

FIG. 8A and FIG. 8B show an exemplary structure of the circuit board in the present disclosure, respectively. Please refer to FIG. 5, FIG. 8A and FIG. 8B. In the embodiment, the self-cooling motor 1 further includes a circuit board 50 disposed adjacent to the first end 11a of the sleeve 11 and has an opening 51. In the embodiment, the circuit board 50 is connected to the stator assembly 20, and includes a leading element 53 externally connected for an electrical connection. In the embodiment, the circuit board 50 has an outer periphery disposed adjacent to an inner periphery of the sleeve 11. Preferably but not exclusively, the outer periphery of the circuit board 50 is disposed adjacent to the first end 11a of the sleeve 11. In an embodiment, the circuit board 50 is disposed upwardly along the axial direction A, and the circuit board 50 is located above the first end 11a of the sleeve 11, or aligned with the first end 11a of the sleeve 11. It facilitates the airflow F to enter the air inlet 14 in the radial direction, and then pass through the space 12 along the axial direction A through the opening 51. Certainly, the present disclosure is not limited thereto. The arrangement and the size of the circuit board 50 are adjustable according to the practical requirements. In the embodiment, the stator assembly 20 further includes a coil 21, and the opening 51 of the circuit board 50 spatially corresponds to the coil 21. Since the coil 21 of the stator assembly 20 is the main heat-generating component, the airflow F is introduced toward the coil 21 directly due to the design of the opening 51 of the circuit board 50. Thus, the heat dissipation efficiency of the self-cooling motor 1 is enhanced effectively.

Please refer to FIGS. 1 to 5. In the embodiment, the rotor assembly 30 of the self-cooling motor 1 includes a shell 32 and a magnet set 33. The shell 32 is fixed to the shaft 31 and has an opening 34 facing the axial direction A. The magnet set 33 is disposed around an inner periphery of the shell 32. In the embodiment, the magnet set 33 spatially corresponds to the coil 21 of the stator assembly 20. The shell 32 and the magnet set 33 are sleeved on an outer periphery of the coil 21. In the embodiment, the opening 34 of the shell 32 spatially corresponds to the coil 21, too. Since the coil 21 of the stator assembly 20 is the main heat-generating component, the airflow F is transported away from the coil 21 directly due to the design of the opening 34 of the shell 32. Thus, the heat dissipation efficiency of the self-cooling motor 1 is enhanced effectively. In other words, when the airflow F enters the space 12 through the air inlet 14 formed between the bottom plate 13 and the first end 11a of the sleeve 11, the airflow F further passes through the space 12 along the axial direction A, and then the airflow F is discharged out through the air outlet 15 formed between the impeller 40 and the second end 11b of the sleeve 11. Since the openings 34 of the rotor assembly 30 and the openings 51 of the circuit board 50 are disposed in the space 12 and arranged along the axial direction A. It is conducive to a smooth passage of the airflow. Furthermore, the heat generated by the stator assembly 20 and the internal parts on the circuit board 50 is dissipated effectively. Thus, the heat dissipating efficiency of the self-cooling motor 1 is further enhanced.

Figure 9A:
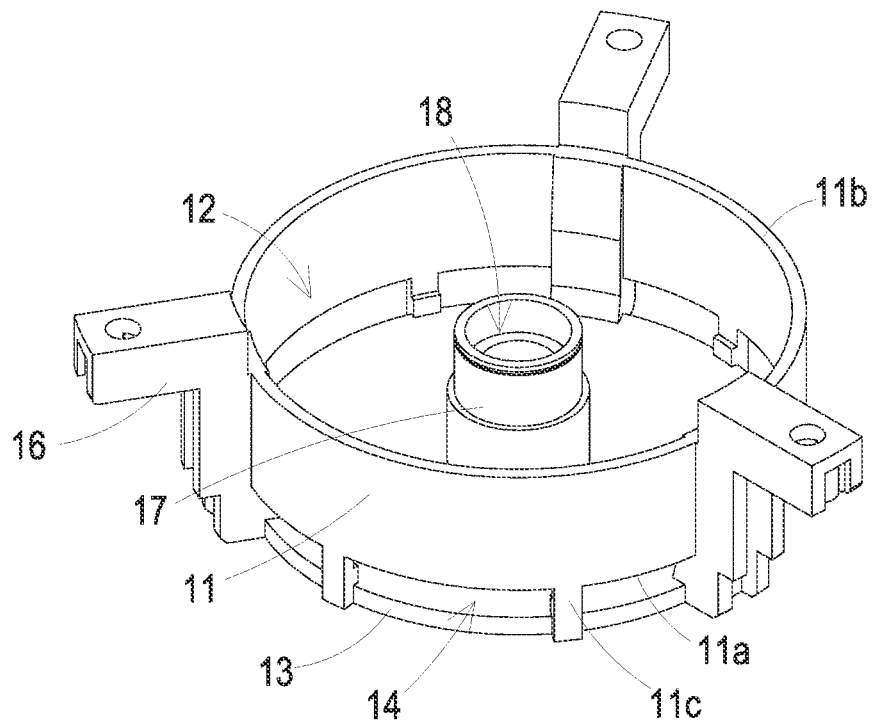
FIG. 9A and FIG. 9B are an exemplary structure showing the housing of the present disclosure.
Figure 9B:
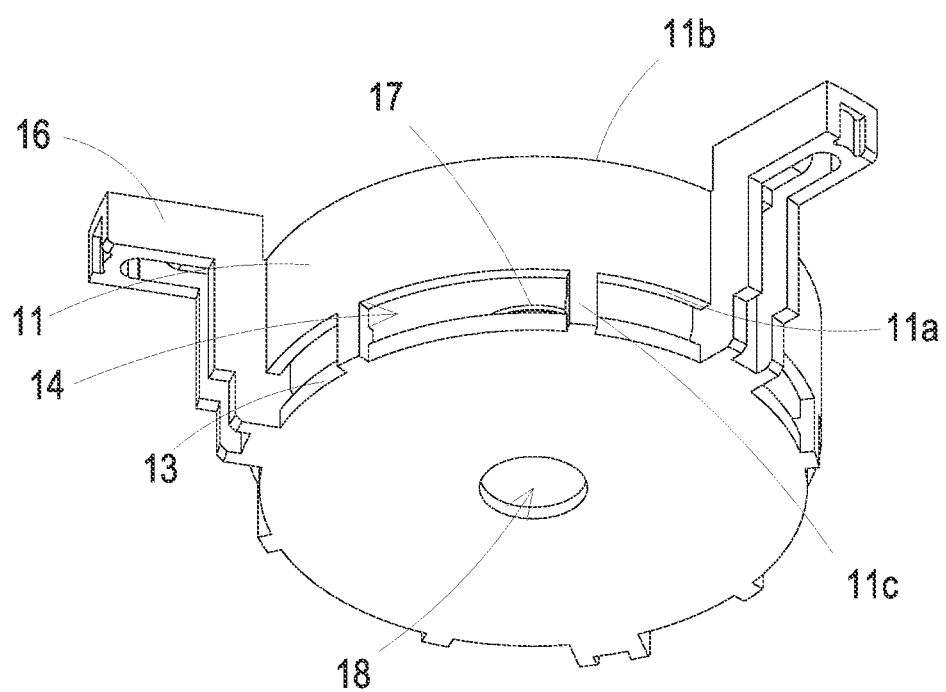

FIG. 9A and FIG. 9B show an exemplary structure of the housing in the present disclosure, respectively. Please refer to FIGS. 1 to 6, FIG. 9A and FIG. 9B. In the embodiment, the housing 10 further includes a plurality of fastening elements 16 configured to fasten the self-cooling motor 1 to a box 70 of a hot-air-circulation device 2. Preferably but not exclusively, the housing 10 includes three fastening elements 16, which are arranged around the outer periphery of the sleeve 11 at equal distances from each other, and protrude from the second end 11b of the sleeve 11. In other embodiments, the arrangement and the number of the fastening elements are adjustable according to the practical requirements. The present disclosure is not limited thereto. In the embodiment, the self-cooling motor 1 is fixed to the box 70 of the hot-air-circulation device 2 through the fastening elements 16 of the housing 10, and the shaft 31 of the motor 1 extends into the heating chamber 71 of the box 70 through the impeller 40. With that arrangement, while the self-cooling motor 1 is fixed to the box 70, the fastening elements 16 provide the function of fastening and reinforcing the structure, and the air outlet 15 adjacent to the second end 11b of the sleeve 11 is formed between the fastening elements 16, so as to provide the function of guiding the airflow direction. In addition, the housing 10 further includes a plurality of connecting elements 11c connected between the first end 11a of the sleeve 11 and the bottom plate 13. Preferably but not exclusively, the air inlet 14 is disposed between the connecting elements 11c. In that, the connecting elements 11c provide not only the function of connection but also the function of guiding the airflow direction. Preferably but not exclusively, in the embodiment, the fastening elements 16 also protrude from the first end 11a of the sleeve 11 to provide a connection between the bottom plate 13 and the sleeve 11, so that the air inlet 14 is located between the fastening elements 16 and the connecting elements 11c to provide the function of guiding the airflow direction. Certainly, the arrangements and the numbers of the fastening elements 16 and the connecting elements 11c are adjustable according to the practical requirements. The present disclosure is not limited thereto and not redundantly described herein.

Please refer to FIGS. 1 to 5, FIG. 9A and FIG. 9B. In the embodiment, the housing 10 includes a central portion 17 and a channel 18. The channel 18 passes through the central portion 17. Preferably but not exclusively, the stator assembly 20 is fixed to an outer periphery of the central portion 17, and further includes an engaging element for engaging with the fixing opening 52 of the circuit board 50, so as to connect the circuit board 50 and the stator assembly 20. Preferably but not exclusively, the shaft 31 of the rotor assembly 30 is connected to the stator assembly 20 through a bearing 60. In the embodiment, the bearing 60 is disposed within the channel 18, and the shaft 31 passes through the channel 18 and the bearing 60 to achieve the connection between the stator assembly 20 and the rotor assembly 30. Certainly, the present disclosure is not limited thereto. In the embodiment, the central portion 17 is connected to the bottom plate 13, and the channel 18 passes through the bottom plate 13, to facilitate the bearing 60 to be mounted in the channel 18 and be connected nearby a first end portion 31a of the shaft 31. In the embodiment, except for the channel 18, there is no aperture passing through the bottom plate 13. When the channel 18 is equipped with the bearing 60, the bottom plate 13 can prevent the circuit board 50 from being exposed, causing an external static electricity to damage the electronic components, or resulting in a short circuit or an open circuit due to a foreign matter intrusion.

Please refer to FIGS. 1 to 6. As mentioned above, the self-cooling motor 1 of the present disclosure is suitable for a hot-air-circulation device 2. Therefore, the present disclosure further discloses a hot-air-circulation device 2, which includes a box 70, a self-cooling motor 1 and a fan assembly 80. In the embodiment, the box 70 includes a heating chamber 71 and a recessed portion 72. The recessed portion 72 is in communication with the heating chamber 71. The self-cooling motor 1 and the fan assembly 80 are disposed in the recessed portion 72. In the embodiment, the self-cooling motor 1 includes a housing 10, a stator assembly 20, a rotor assembly 30 and an impeller 40. In the embodiment, the housing 10 is fastened to the box 70 and includes a sleeve 11, a space 12 and a bottom plate 13. The bottom plate 13, the sleeve 11, the impeller 40 and the fan assembly 80 are arranged in sequence along the axial direction A. The space 12 is located between the sleeve 11 and the bottom plate 13. The sleeve 11 has a first end 11a and a second end 11b. The first end 11a and the second end 11b are opposite to each other. The bottom plate 13 is disposed adjacent to the first end 11a of the sleeve 11, and an air inlet 14 is formed between the bottom plate 13 and the first end 11a of the sleeve 11. The air inlet 14 faces a radial direction of the sleeve 11. In the embodiment, the second end 11b faces the heating chamber 71. The stator assembly 20 is fixed to the housing 10 and accommodated in the space 12. The rotor assembly 30 is coupled to the stator assembly 20 and includes a shaft 31. In the embodiment, the shaft 31 extends into the heating chamber 71 of the box 70 along the axial direction A. In the embodiment, the shaft 31 includes a first end portion 31a and a second end portion 31b opposite to each other. The first end portion 31a is connected to the housing 10, and the second end portion 31b is extended into the box 70. The impeller 40 is fixed between the first end portion 31a and the second end portion 31b of the shaft 30 and located between the heating chamber 71 and the sleeve 11 and adjacent to the second end 11b of the sleeve 11. In that, an air outlet 15 is formed between the impeller 40 and the second end 11b of the sleeve 11. The air outlet 15 faces the radial direction of the sleeve 11. When the shaft 31 of the rotor assembly 30 drives the impeller 40 to rotate simultaneously, an airflow F is generated by the impeller 40. The airflow F enters the space 12 through the air inlet 14 in the radial direction and is discharged out of the space 12 through the air outlet 15 in the radial direction. Moreover, in the embodiment, the shaft 31 further includes a first fixing element 31c, such as a thread, which is disposed adjacent to the second end portion 31b. The fan assembly 80 includes a second fixing element 81, such as a nut. By engaging the first fixing element 31c and the second fixing element 81 with each other, the fan assembly 80 is fixed to the second end portion 31b of the shaft 31. When the self-cooling motor 1 drives the fan assembly 80 to rotate, hot air is circulated by the fan assembly 80 in the heating chamber 71. In the embodiment, the shaft 31 of the self-cooling motor 1 is extended to the heating chamber 71 of the hot-air-circulation device 2 through the impeller 40, and the air outlet 14 and the air inlet 15 are formed by assembling the impeller 40 with the housing 10, to optimize the heat dissipation efficiency of the motor 1. The impeller 40 is arranged between the motor 1 and the heating chamber 71, so that it is facilitated to block the radiant heat from the heating chamber 71. Moreover, it is helpful of improving the temperature conditions inside the motor 1 to extend the service life of the internal parts, and reducing the probability of damage to the internal parts. Thus, the motor 1 has higher stability. On the other hand, the motor 1 having high stability drives the fan assembly 80 to rotate in the heating chamber 71 through the shaft 31, and it makes the circulation of the hot air in the heating chamber 71 more uniform. The quality of food heating is improved. Certainly, the method of combining the self-cooling motor 1 with the hot-air-circulation device 2 is adjustable according to the practical requirements. The present disclosure is not limited thereto and not redundantly described herein.

Figure 10:
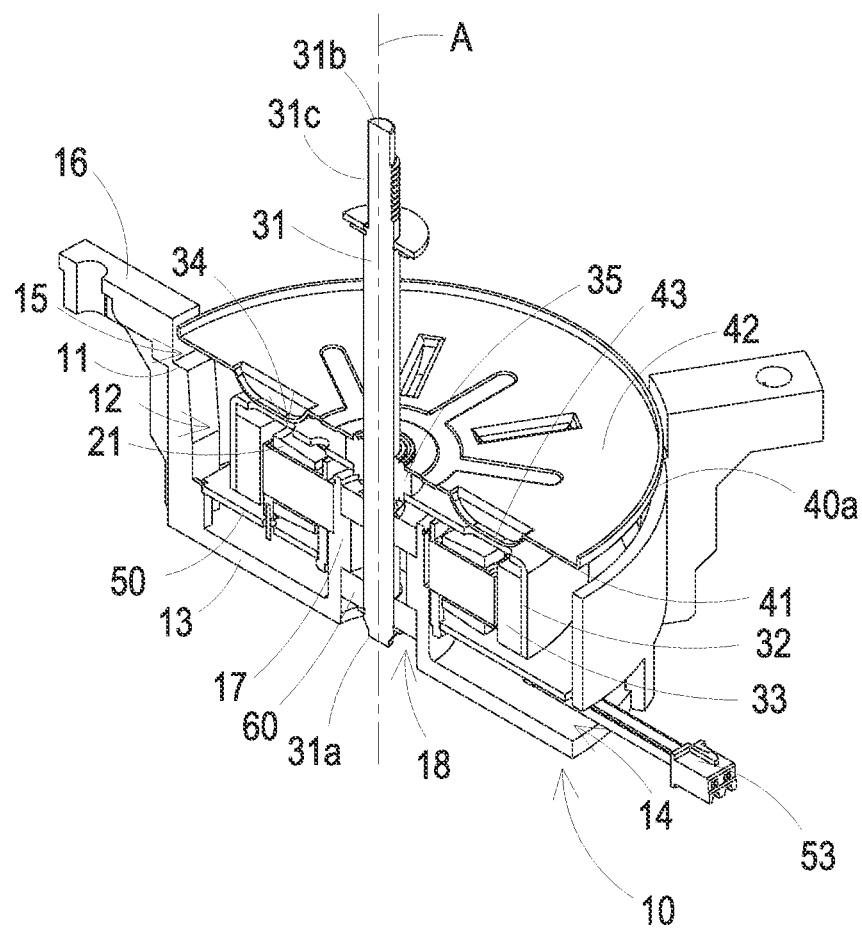
FIG. 10 shows a cross-sectional structure of a self-cooling motor according to a second embodiment of the present disclosure.
Figure 11:
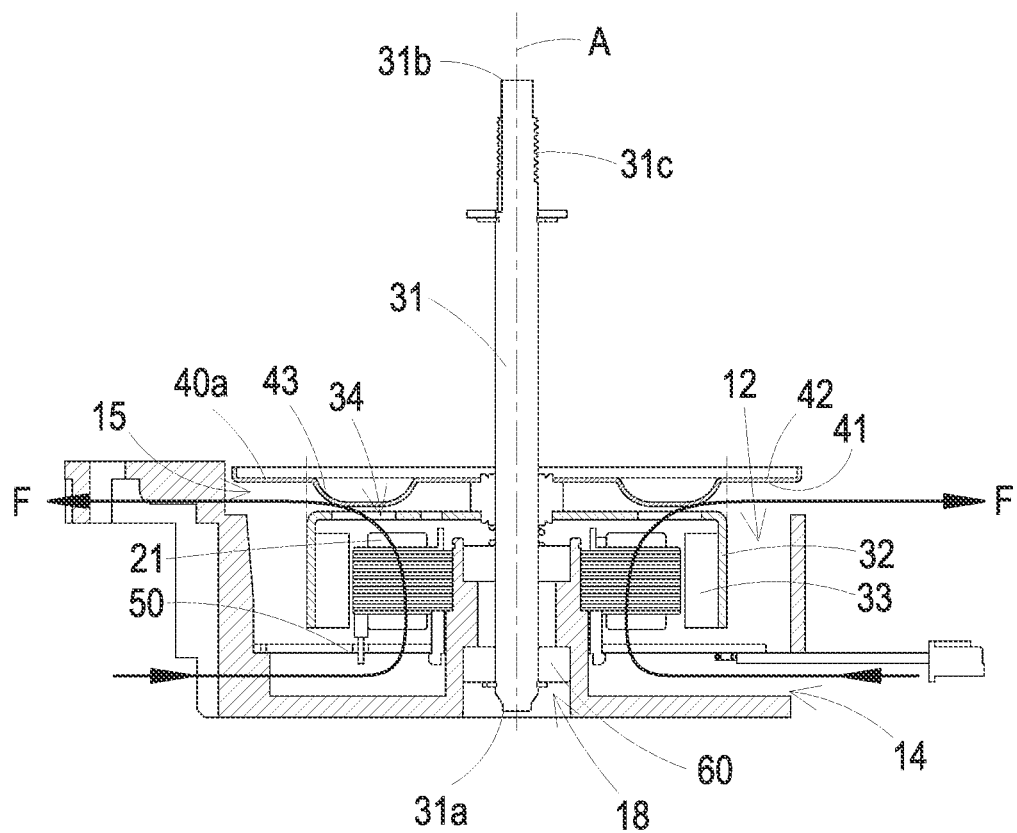
FIG. 11 is a cross-sectional view illustrating an airflow of the self-cooling motor according to the second embodiment of the present disclosure.

FIG. 10 shows a cross-sectional structure of a self-cooling motor according to a second embodiment of the present disclosure. FIG. 11 is a cross-sectional view illustrating an airflow of the self-cooling motor according to the second embodiment of the present disclosure. In the embodiment, the self-cooling motor 1a is similar to the self-cooling motor 1 shown in FIGS. 1 to 9, and the same labels of the components represent the same components, structures and functions, and are not redundantly described herein. In the embodiment, an outer periphery of each one of the blades 43 of the impeller 40a does not exceed an outer periphery of shell 32 of the rotor assembly 30 along the radial direction outwardly. Since there is no perforation passing through the impeller 40 while the impeller 40 is fixed to the shaft 31, when the impeller 40 is rotated synchronously with the shaft 31 of the motor 1, the airflow F is generated therefrom to dissipate the heat generated inside the motor 1 effectively, and the impeller 40 without any additional perforation is more beneficial of blocking the radiant heat from the heating chamber 71. It is helpful of improving the temperature conditions inside the motor 1a to extend the service life of the internal parts, and reducing the probability of damage to the internal parts. Thus, the motor 1a has higher stability.

In summary, the present disclosure provides a self-cooling motor and a hot-air-circulation device using the same. The motor has a shaft extended to the high-temperature heating chamber of the hot-air-circulation device through an impeller, and a radial air outlet and a radial air inlet are formed by assembling the impeller with the housing to optimize the heat dissipation efficiency of the motor. The impeller is arranged between the motor and the heating chamber, so that it is facilitated to block the radiant heat from the heating chamber. Moreover, it is helpful of improving the temperature conditions inside the motor to extend the service life of the internal parts, and reducing the probability of damage to the internal parts. Thus, the motor has higher stability. Furthermore, the impeller further includes a plurality of blades, which extend toward the space of the motor, and are arranged radially. When the impeller rotates with the shaft of the motor, the blades disposed on the impeller drive the airflow to discharge out radially to form a negative pressure. The heat generated by the stator components, such as silicon steel sheets and windings, is transferred toward the negative pressure region and then is discharged out in the radial direction to achieve the heat dissipation performance of the self-cooling motor. Moreover, the heat dissipation performance of the self-cooling motor is not easily affected by the heating chamber of the hot air circulation device. In addition, the self-cooling motor is fastened to the box of the hot-air circulation device through a plurality of fastening elements on the housing, and the shaft of the motor extends into the heating chamber of the box through the impeller. While the self-cooling motor is fastened to the box, the fastening elements provide the function of fastening and reinforcing the structure. On the other hand, the airflow enters the space through an air inlet formed between the bottom plate and the first end of the sleeve, flows through the space in the axial direction and is discharged out through an air outlet formed between the impeller and the second end of the sleeve. Since the rotor assembly and the circuit board in the space further include openings facing the axial direction, it is conducive to a smooth passage of the airflow. Furthermore, the heat generated by the stator assembly and the internal parts on the circuit board is dissipated effectively. Thus, the heat dissipating efficiency of the self-cooling motor is further enhanced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. A self-cooling motor comprising:
    a housing comprising a sleeve and a bottom plate, wherein the sleeve and the bottom plate are arranged in an axial direction to define a space, wherein the sleeve has a first end and a second end opposite to each other, the bottom plate is disposed adjacent to the first end, and an inlet is formed between the bottom plate and the first end, wherein the inlet faces a radial direction of the sleeve;
    a stator assembly fixed to the housing and accommodated in the space;
    a rotor assembly coupled to the stator assembly and comprising a shaft, wherein the shaft extends outside the housing along the axial direction; and
    an impeller fixed to the shaft and adjacent to the second end to form an outlet, wherein the outlet faces the radial direction of the sleeve, wherein when the shaft drives the impeller to rotate, an airflow is generated by the impeller, and wherein the airflow enters the space through the inlet in the radial direction and is discharged through the outlet in the radial direction, wherein the impeller has an outer periphery exceeding an inner periphery of the sleeve along the radial direction outwardly.

2. The self-cooling motor according to claim 1, wherein the impeller comprises a first side, a second side and a plurality of blades, the first side and the second side are opposite to each other, the first side faces the space, and the blades are disposed on the first side.

3. The self-cooling motor according to claim 2, wherein there is no through hole disposed between any two adjacent blades.

4. The self-cooling motor according to claim 2, wherein an outer periphery of the blades does not exceed an outer periphery of the rotor assembly along the radial direction outwardly.

5. The self-cooling motor according to claim 1, wherein the bottom plate has an outer periphery aligned with or exceeding the inner periphery of the sleeve along the radial direction outwardly.

6. The self-cooling motor according to claim 1, further comprising a circuit board disposed above or aligned with the first end of the sleeve along the axial direction upwardly.

7. The self-cooling motor according to claim 1, wherein the rotor assembly comprises a shell and a magnet set, wherein the shell is fixed to the shaft and has an opening facing the axial direction, and the magnet set is disposed around an inner periphery of the shell.

8. The self-cooling motor according to claim 1, wherein the housing further comprises a plurality of fastening elements configured to fasten the self-cooling motor to a box, wherein the outlet is disposed between the fastening elements.

9. The self-cooling motor according to claim 1, wherein the housing further comprises a plurality of connecting elements connected between the first end of the sleeve and the bottom plate, wherein the inlet is disposed between the connecting elements.

10. The self-cooling motor according to claim 1, wherein the impeller is made of a metal material, a low thermal conductivity material or a ceramic material.

11. The self-cooling motor according to claim 1, wherein there is no through hole passing through the impeller while the impeller is fixed to the shaft.

12. A hot-air-circulation device, comprising:
a box comprising a heating chamber;
a self-cooling motor comprising:
a housing fastened to the box and comprising a sleeve and a bottom plate, wherein the sleeve and the bottom plate collaboratively define a space, the sleeve has a first end and a second end opposite to each other, the bottom plate is disposed adjacent to the first end, and an inlet is formed between the bottom plate and the first end, wherein the inlet faces a radial direction of the sleeve, and the second end faces the heating chamber;
a stator assembly fixed to the housing and accommodated in the space;
a rotor assembly coupled to the stator assembly and comprising a shaft, wherein the shaft extends into the heating chamber along the axial direction; and
an impeller fixed to the shaft and located adjacent to the second end to form an outlet, wherein the outlet faces the radial direction of the sleeve, wherein when the shaft drives the impeller to rotate synchronously, an airflow is generated by the impeller, the airflow enters the space through the inlet in the radial direction and is discharged through the outlet in the radial direction, wherein the impeller has an outer periphery exceeding an inner periphery of the sleeve along the radial direction outwardly; and
a fan assembly connected to the shaft, wherein when the self-cooling motor drives the fan assembly to rotate, hot air is circulated in the heating chamber.

13. The hot-air-circulation device according to claim 12, wherein the impeller comprises a first side, a second side and a plurality of blades, the first side and the second side are opposite to each other, the second side faces the heating chamber, and the blades are disposed on the first side, extend toward the space and are arranged radially.

14. The hot-air-circulation device according to claim 12, wherein the self-cooling motor further comprises a circuit board having an opening, and the stator assembly comprises a coil, wherein the opening of the circuit board spatially corresponds to the coil.

15. The hot-air-circulation device according to claim 12, wherein the rotor assembly comprises a shell and a magnet set, the shell is fixed to the shaft and has an opening facing the axial direction, and the magnet set is disposed around an inner periphery of the shell, wherein the impeller comprises a plurality of blades extending outwardly along the radial direction, and an outer periphery of each one of the blades does not exceed an outer periphery of the shell along the radial direction outwardly.

16. The hot-air-circulation device according to claim 12, wherein the housing further comprises a plurality of fastening elements configured to fasten the self-cooling motor to the box.

17. The hot-air-circulation device according to claim 12, wherein the housing further comprises a plurality of connecting elements connected between the first end of the sleeve and the bottom plate, wherein the inlet is disposed between the connecting elements.

18. The hot-air-circulation device according to claim 12, wherein the bottom plate, the sleeve, the impeller and the fan assembly are arranged in sequence along the axial direction.

* * * * *